UNITED STATES PATENT OFFICE.

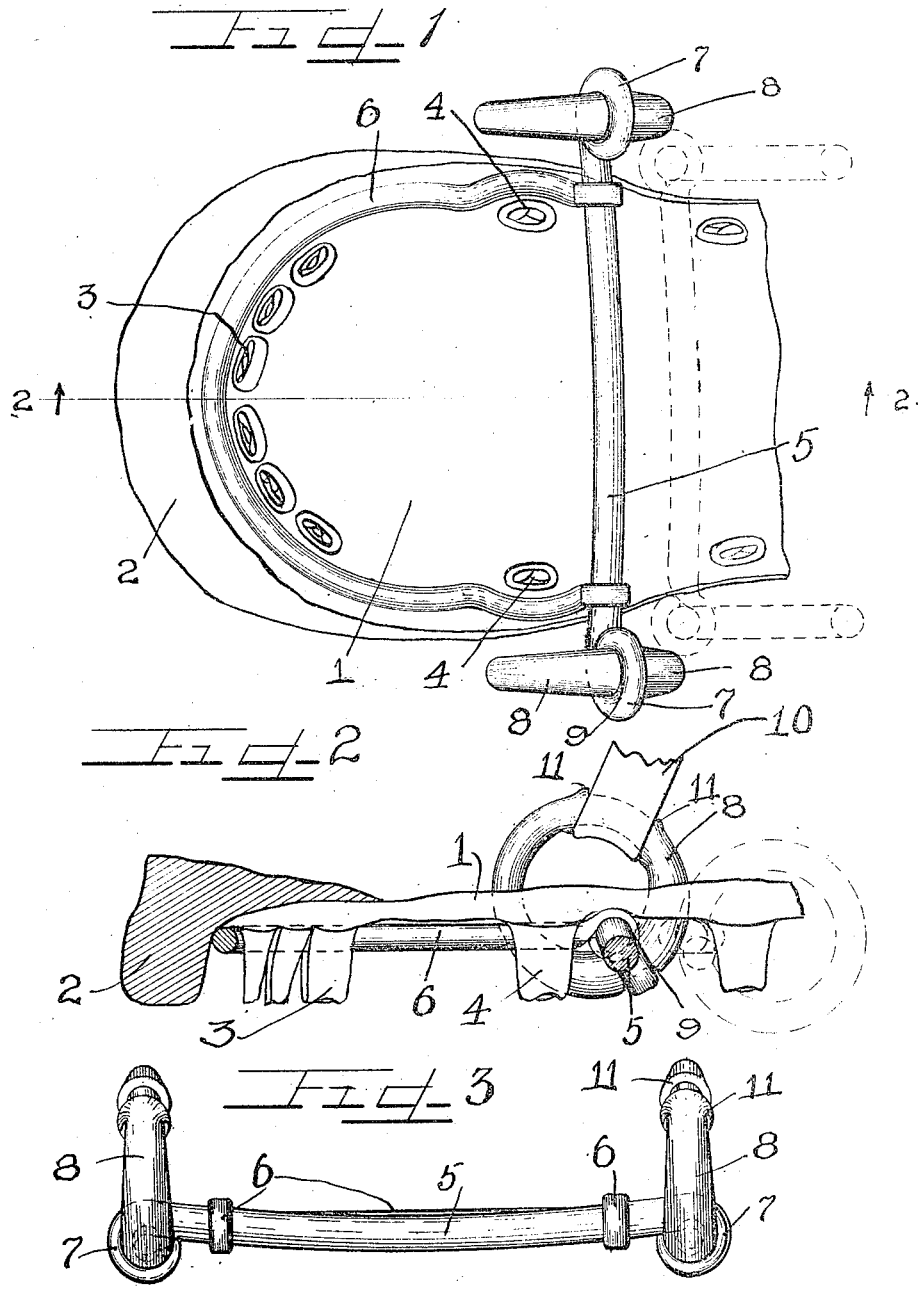

DORA H. HOGAN, OF CHICAGO, ILLINOIS.

OVERCHECK BREAKING-BIT FOR KICKING HORSES.

1,034,452.  Specification of Letters Patent.  Patented Aug. 6, 1912.

Application filed January 9, 1911. Serial No. 601,587.

*To all whom it may concern:*

Be it known that I, DORA H. HOGAN, a citizen of the United States, and a resident of the city of Chicago, Cook county, Illinois, have invented certain new and useful Improvements in Overcheck Breaking-Bits for Kicking Horses; and I do hereby declare that the following is a full, clear, and exact description of the same, reference being had to the accompanying drawings, and to the numbers of reference marked thereon, which form a part of this specification.

It is a matter of common experience that a horse cannot kick if the head be held up. Ordinary bits do not prevent the horse from swinging the head down toward the knees sufficiently low to permit kicking. This is true even though the horse be checked up somewhat.

The object of this invention is to provide an overcheck bit of such construction as to necessitate the horse holding the head up and to prevent the horse turning the nose downwardly and inwardly toward the chest, as is invariably the case in kicking.

It is an object of the invention to provide a breaking bit that although not a cruel bit or likely to injure the mouth of the horse, is yet so constructed as to necessitate the elevation of the head at all times.

The invention consists in the matters hereinafter described and more fully pointed out and defined in the appended claims.

In the drawings: Figure 1 is a plan view of the roof of the upper jaw of the horse showing the bit in place. Fig. 2 is a central longitudinal section on line 2—2 of Fig. 1. Fig. 3 is a rear elevation showing the bit removed from the mouth.

As shown in said drawings: 1, indicates the roof of the horse's mouth; 2, the upper lip; 3, the upper front teeth; and 4, the bridle teeth in the upper jaw.

5, indicates a bar bit extending across the mouth in close relation with the bridle bit shown in dotted lines, and used as is usual. Rigidly connected with the bit 5, by welding or integrally, as preferred, is a U shaped loop 6, offset laterally to extend around the front bridle teeth on the outer side thereof and thence forwardly and around the front upper teeth between them and the lip, and the same as shown in Fig. 1. At each end of the bar 5, is a downwardly turned loop or eye 7, which, as shown in Figs. 2 and 3, is directed somewhat rearwardly and downwardly. Engaged in each of said eyes is a ring 8, provided with a shoulder 9, on each side of said downturned loop to bear against the same whereby said ring, when turned upwardly, as shown, extends forwardly and rearwardly from the eyes of the bit bar. The side straps 10, of the overcheck engage in the tops of said rings between shoulders 11, integral with the rings and thence are connected with a center strap (not shown) which extends upwardly between the eyes and leads as is usual, over the crown piece and forms the overcheck rein. In consequence, when the horse is checked up, a considerable upward strain is produced between the upper front teeth and upper lip causing the horse to hold the head up, and any attempt of the horse to move the head down causes pressure of said U shaped extension of the bit between the lip and the teeth, which promptly discourages such action. Of course, owing to the forward inclination of the top rings, a considerable leverage is afforded on said bit extension and this leverage is always present, even though the shoulders 9, on said ring should be omitted.

Of course, details of the construction may be varied and I therefore do not purpose limiting the patent for this invention otherwise than necessitated by the prior art.

I claim as my invention:

1. An overcheck anti-kicking bit embracing a bar, a loop rigidly secured at its ends to said bar adapted to extend around outside the teeth of the upper jaw and beneath the upper lip of an animal, and forwardly and upwardly extending levers secured on said bar adapted to force said loop upwardly to bear firmly against the gums and teeth when a pull is exerted thereon.

2. An anti-kicking bit embracing a bar, a U shaped extension rigidly secured at its ends on said bar adapted to extend around 100 outside of the upper jaw and beneath the upper lip of an animal and offset laterally to permit the same to extend around the front bridle teeth, and levers secured to said bar adapted to force the extension upwardly against the gums and teeth when a slight pull is exerted thereon.

3. A bit of the class described, embracing a combination with a transverse overcheck bit bar having rings engaged thereon to afford forwardly directed levers, of a loop extension rigidly secured on the bit bar adapted to extend around the teeth of the upper jaw of an animal and looped outwardly to permit the same to approximately fit the front bridle teeth and adapted to bear upwardly against the gums and teeth when a pull is exerted on the rings.

4. A bit of the class described, embracing a bit bar having its ends shaped to afford a rearwardly and downwardly turned loop at each end thereof, a U shaped extension rigidly secured at its ends to said bar and adapted to extend around and outside the teeth of the upper jaw and beneath the upper lip of an animal, and a ring engaged in each of said loops adapted when turned upwardly to extend forwardly and rearwardly from the bit bar to afford a lever at each end of the bit bar adapted to rotate the bit bar slightly when a pull is exerted thereon and thereby force the extension upwardly.

In testimony whereof I have hereunto subscribed my name in the presence of two subscribing witnesses.

DORA H. HOGAN.

Witnesses:
LAWRENCE REIBSTEIN,
CHARLES W. HILLS, Jr.